United States Patent
Hong et al.

(10) Patent No.: US 8,446,662 B2
(45) Date of Patent: May 21, 2013

(54) ELECTROPHORETIC DISPLAY DEVICE AND METHOD FOR MANUFACTURING SAME

(75) Inventors: Wang-Su Hong, Suwon-Si (KR); Seung-Jin Baek, Seoul (KR); Jang-Kyum Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 11 days.

(21) Appl. No.: 13/473,414

(22) Filed: May 16, 2012

(65) Prior Publication Data
US 2012/0224251 A1  Sep. 6, 2012

Related U.S. Application Data

(62) Division of application No. 12/970,810, filed on Dec. 16, 2010, now Pat. No. 8,203,778.

(30) Foreign Application Priority Data

Mar. 22, 2010 (KR) .......................... 10-2010-0025138

(51) Int. Cl.
  *G02B 26/00* (2006.01)
  *G02B 26/08* (2006.01)
  *G02F 1/29* (2006.01)

(52) U.S. Cl.
  USPC .......................... 359/295; 359/296; 359/298

(58) Field of Classification Search
  USPC ................. 359/237, 243, 290–292, 295, 296, 359/298
  See application file for complete search history.

(56) References Cited

U.S. PATENT DOCUMENTS

| | | | |
|---|---|---|---|
| 6,825,829 B1 * | 11/2004 | Albert et al. ................... | 345/107 |
| 7,341,642 B2 | 3/2008 | Kumakura | |
| 7,791,782 B2 | 9/2010 | Paolini et al. | |
| 7,843,626 B2 | 11/2010 | Amundson et al. | |
| 8,026,029 B2 * | 9/2011 | Miyazawa ..................... | 430/104 |
| 2005/0286116 A1 * | 12/2005 | Kanbe ........................... | 359/296 |
| 2012/0019895 A1 | 1/2012 | Shin et al. | |

FOREIGN PATENT DOCUMENTS

| | | | |
|---|---|---|---|
| EP | 1291966 A1 | | 3/2003 |
| JP | 10-333601 | * | 12/1998 |
| JP | 11-330162 A | | 11/1999 |
| JP | 3072602 U | | 8/2000 |
| JP | 2002-343934 A | | 11/2002 |
| JP | 2003-028889 A | | 1/2003 |
| JP | 3098333 U | | 9/2003 |
| JP | 2005-200505 A | | 7/2005 |
| JP | 2007-010694 A | | 1/2007 |
| JP | 2008-235840 A | | 10/2008 |
| KR | 100790671 B1 | | 12/2004 |
| KR | 1020080074590 A | | 8/2008 |

* cited by examiner

*Primary Examiner* — Thomas K Pham
*Assistant Examiner* — Brandi Thomas
(74) *Attorney, Agent, or Firm* — Innovation Counsel LLP (57) ABSTRACT

A method of manufacturing is disclosed for an electrophoretic display apparatus that includes an array substrate and an electrophoretic film laminated to the array substrate. A thermally activated adhesive is used to adhesively attach the electrophoretic film to the array substrate. The electrophoretic film is first aligned to and flattened against the array substrate and then a substantially stronger than original adhesion property of the adhesive is activated by annealing at a high temperature that is substantially greater than room temperature. Rework prior to annealing is therefore possible when alignment errors occur between the electrophoretic film and the array substrate.

5 Claims, 6 Drawing Sheets

ELECTROPHORETIC DISPLAY DEVICE AND METHOD FOR MANUFACTURING SAME

CROSS-REFERENCE TO RELATED APPLICATION

This application is a divisional application of U.S. patent application Ser. No. 12/970,810 filed on Dec. 16, 2010, which claims priority to and the benefit of Korean Patent Application No. 10-2010-0025138 filed in the Korean Intellectual Property Office on Mar. 22, 2010, the entire contents of the prior applications being incorporated herein by reference.

BACKGROUND

1. Field of Disclosure

The present disclosure of invention relates to electrophoretic displays and methods of manufacturing the same. More particularly, the present disclosure relates to a method of binding together an electrophoretic film and an array substrate against which the electrophoretic film is flattened and aligned; with use of adhesive that is activated at high temperature.

2. Description of Related Art

Generally, an electrophoretic display apparatus operates as a reflective type of display that selectively reflects light incident thereon and which is received from an external source where the selectively reflected light appears as an informational image to a user (viewer) of the display. More particularly, the electrophoretic display apparatus is generally structured to include a plurality of small microcapsules each enclosing white ink particles pre-charged for example with a negative electric charge, black ink particles pre-charged with an opposed positive electric charge, and a dielectric fluid where the microcapsule is disposed between two electrodes, one of the electrodes often being a light-passing (e.g., transparent) electrode.

In the electrophoretic display apparatus, a voltage is applied and an electric field is formed as between the opposed electrodes of a respective one or more microcapsules. In response to a first voltage polarity and voltage magnitude, a white reflecting surface is caused to be displayed when the white ink particles assemble adjacent to a viewing side of the light-passing microcapsule. By contrast and in response to an opposed second voltage polarity and sufficiently strong second voltage magnitude, a black color reflecting surface is caused to be displayed when the black ink particles exchange positions with the white particles and come to be instead assembled adjacent to a viewing side of the microcapsule. Thus when a white light is incident from an external source onto differently driven microcapsules, the electrophoretic display apparatus displays an image (e.g., black and white; or absorbing versus reflecting) corresponding to the white-light reflecting or black and thus light-absorbing pixels defined by the respectively differently driven ones of the microcapsules.

One type of electrophoretic display apparatus is manufactured by binding an electrophoretic microcapsules containing film to an array substrate on which a driving circuit integrally is formed. It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

A method of manufacturing an electrophoretic display in accordance with the present disclosure includes: forming a monolithically integrated array substrate including a plurality of thin film transistors (TFTs) with each being electrically connected to a corresponding gate line, a corresponding source line (data line), and a corresponding pixel electrode; overlapping, flattening and aligning a flexible electrophoretic film having an electrophoretic layer against the array substrate where the adhesive is interposed between the electrophoretic film and the array substrate; and annealing (curing) the adhesive at a temperature of more than about 60° C. but less than an adhesive decomposing one (e.g., about 150° C.) for thereby providing a substantial increase of adhesive strength to the adhesive after the patterned electrophoretic film has been aligned to and flattened against the array substrate.

The adhesive may include at least two reactive compositions whose cross reaction is selectively induced by a temperature substantially above room temperature, and the at least two compositions may include a phenol resin.

The at least two compositions may include an acrylic rubber.

The adhesive may include a silicon filler at over 0% and under 15% by weight composition ratio.

The adhesive may include an acrylic rubber at over 40% and under 80% by weight composition ratio.

The adhesive may include a phenol resin such as bisphenol A and an epoxy resin.

The adhesive may include an epoxy phenol resin at over 0% and under 50% by weight composition ratio, a silicon filler at over 0% and under 15% by weight composition ratio, and an acrylic rubber at over 40% and under 80% by weight composition ratio.

An electrophoretic display in accordance with the present disclosure includes: an array panel including a thin film transistor connected to a gate wire and a source wire, and a pixel electrode connected to the thin film transistor; an electrophoretic film including a patterned electrophoretic layer (e.g., one having a framing area that frames (surrounds) a display area thereof) and a common electrode; and an adhesive positioned between the electrophoretic film and the array panel, wherein the adhesive includes a phenolyic resin such as bisphenol A and an epoxy resin.

The adhesive may include an epoxy phenol resin made of an epoxy resin and a phenol and having an over 0% and under 50% weight composition ratio.

The adhesive may include a silicon filler at 0% and under 15% by weight composition ratio.

The adhesive may include an acrylic rubber at over 40% and under 80% by weight composition ratio. The manufactured electrophoretic display in accordance with the present disclosure has the patterned electrophoretic layer that may be pre-aligned to and flattened against a corresponding pattern (e.g., display area and peripheral area) on the array substrate, with the pre-aligned and flattened electrophoretic layer being strongly adhered to the array panel by a temperature cured version of the adhesive.

BRIEF DESCRIPTION OF THE DRAWINGS

The above and other features and advantages of the present disclosure of invention will become more apparent by describing exemplary embodiments thereof in detail with reference to the accompanying drawings, in which.

DETAILED DESCRIPTION

The present teachings are described more fully hereinafter with reference to the accompanying drawings in which embodiments in accordance with the disclosure are shown. These teachings may, however, be embodied in many different forms and should not be construed as limited to the embodiments set forth herein. Rather, these embodiments are provided so that this disclosure will be thorough and complete, and will fully convey the scope of the present teachings to those skilled in the art. In the drawings, the size and relative sizes of layers and regions may be exaggerated for clarity.

It will be understood that when an element or layer is referred to as being "on," "connected to," or "coupled to" another element or layer, it can be directly on, connected to, or coupled to the other element or layer or intervening elements or layers may be present. In contrast, when an element is referred to as being "directly on," "directly connected to," or "directly coupled" another element or layer, there are no intervening elements or layers present. Like numbers refer to like elements throughout. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein are to be interpreted accordingly.

The terminology used herein is for the purpose of describing particular embodiments only and is not intended to be limiting of the present disclosure of invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures) of the invention. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from details of manufacturing. For example, an implanted region illustrated as a rectangle will typically have rounded or curved features and/or a gradient of implant concentration at its edges rather than a binary change from an implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present teachings.

Unless otherwise defined, all terms (including technical and scientific terms) used herein have the same meaning as commonly understood by one of ordinary skill in the art to which this disclosure most closely pertains. It will be further understood that terms such as those defined in commonly used dictionaries should be interpreted as having a meaning that is consistent with their meaning in the context of the relevant art and will not be interpreted in an idealized or overly formal sense unless expressly so defined herein.

Hereinafter, embodiments will be explained in detail with reference to the accompanying drawings.

Figure 1:
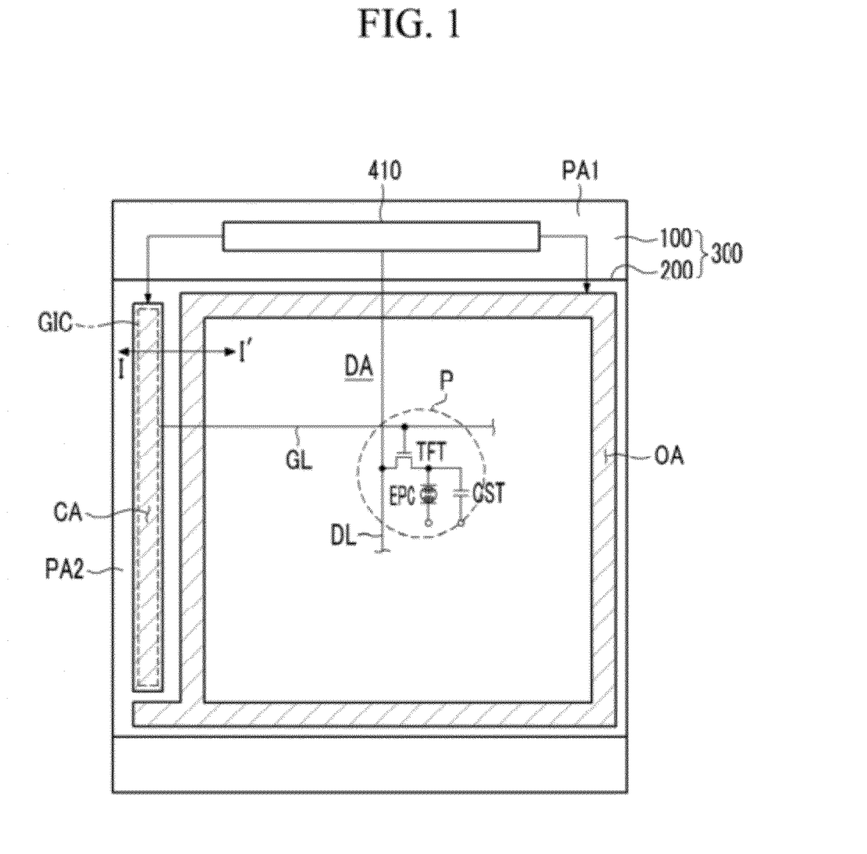
FIG. 1 is a plan view illustrating an electrophoretic display apparatus according to an example embodiment.

FIG. 1 is a plan view illustrating an electrophoretic display apparatus formed according to an example first embodiment of the present teachings.

Referring to FIG. 1, the electrophoretic display apparatus includes an electrophoretic display panel 300 and an electrical driving part 410 structured and connected for driving the electrophoretic display panel 300.

The electrophoretic display panel 300 includes an array substrate 100 and an electrophoretic film 200, flattened against and adhesively bonded to the array substrate 100. The array substrate 100 is patterned to include a display area DA of predefined size and shape (e.g., rectangular) and a peripheral area immediately surrounding the display area DA.

Individual pixel portions P are defined in the display area DA as areas bounded by source lines DL and gate lines GL, where the latter two are nonconnectively crossing each other. Each of the pixel portions P includes a thin film transistor TFT (only one shown) electrically connected to the gate and source lines, GL and DL, corresponding to each pixel portion P. Each of the pixel portions P may be further schematically represented as having a corresponding electrophoretic capacitor EPC electrically connected to the TFT, and a storage capacitor CST electrically connected, for example in parallel with the EPC.

The peripheral area includes a peripheral first outer area OA (also referred to here as a picture framing area) disposed immediately adjacent to the display area DA and surrounding the display area DA like a picture frame, a first further peripheral area PA1 that corresponds to a portion where the source lines DL extending outside of the display area DA and where the driving part 410 is disposed to connect with them. The peripheral area also includes a second further peripheral area PA2 corresponding to a portion where the gate lines GL extend outside of the display area DA. The second further peripheral area PA2 includes a circuit area CA in which a gates-driving circuit part GIC is formed for outputting corresponding gate signals to the gate lines GL. The gates-driving circuit part GIC is monolithically integrated with the display area DA elements (e.g., TFTs) to the substrate 300. As is the case with the display area DA, the gates-driving circuit part GIC has a predefined shape and size and location relative to the display area DA, and in one embodiment, a correspondingly patterned portion of the electrophoretic film 200 might desirably need to be aligned with the circuit area CA.

More specifically, a light blocking electrode (not separately shown in FIG. 1) is formed in the peripheral area portion OA of the array substrate 100, and a patterned light blocking layer covering the gate circuit part GIC is further formed in the circuit area portion CA of the array substrate 100. As a consequence, the electrophoretic film 200 has to be properly aligned to the correspondingly patterned portions of the underlying array substrate 100 so as to provide electrically activated light-blocking action as will be described below.

More specifically, during operation, a data voltage corresponding to a black grayscale is applied to the light-blocking electrode of the electrophoretic film 200, for thereby causing the portion of the electrophoretic layer located there to display the black grayscale in that area. Accordingly as the peripheral area OA (a.k.a. framing area) immediately adjacent to the display area DA is displayed in the contrasting black grayscale, viewing ability of an image displayed in the display area DA is relatively enhanced. The light-blocking layer of the electrophoretic film 200 blocks external light from being incident to active electronic elements of the underlying gate circuit part GIC formed in the circuit area CA, to thus prevent the gate circuit part GIC from being erroneously operated.

The electrophoretic film 200 includes, at its user-viewed major surface, an integral common electrode formed of a light-passing (e.g., transparent) and electrically conductive material. The transparent common electrode is formed on a supporting base substrate made of a flexible material. The electrophoretic film 200 further includes an electrophoretic layer is formed on the common electrode. The electrophoretic layer includes electrophoretic molecules or particles (e.g., microcapsule encapsulated particles) charged with either a positive (+) charge and a negative (−) charge. The electrophoretic film 200 is adhesively attached to a top major surface of the display area DA portion of the main array substrate 100, as well as to the second peripheral area PA2, and the peripheral area OA of the array substrate 100.

Figure 2:
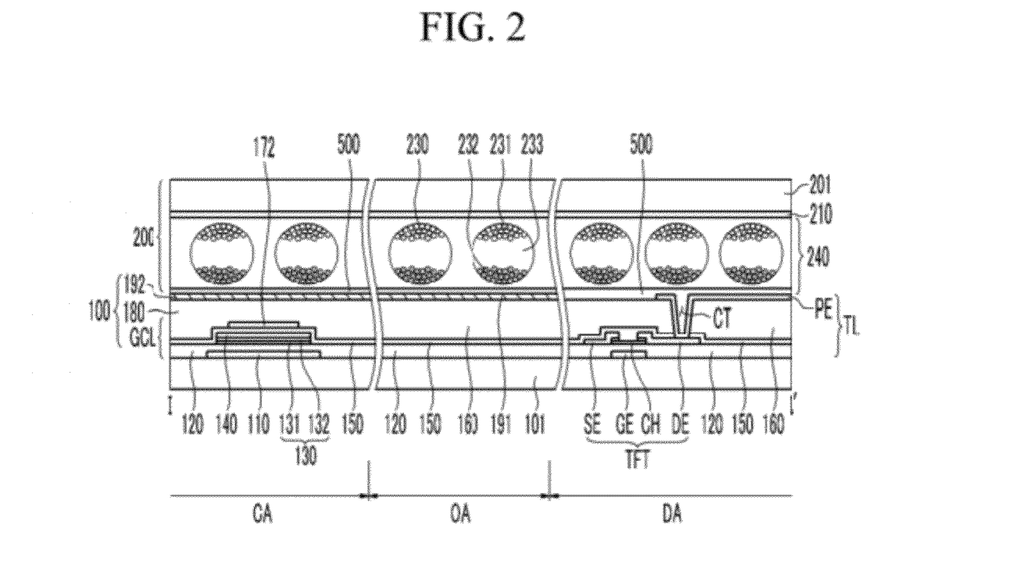
FIG. 2 is a cross-sectional view illustrating the electrophoretic display apparatus according to a first example embodiment taken along a line I-I' of FIG. 1.

FIG. 2 is a cross-sectional view taken along a line I-I' of FIG. 1 and illustrating the electrophoretic display apparatus according to a first example embodiment.

Referring to FIGS. 1 and 2, the electrophoretic display apparatus includes the array substrate 100 and the electrophoretic film 200 pre-aligned to, flattened against, and thereafter strongly adhesively bonded to the array substrate 100. The array substrate 100 includes a first base substrate 101, and the first base substrate 101 has the display area DA, the peripheral area OA, and the circuit area CA defined on an upper major surface thereof.

A thin film transistor layer TL is formed in the display area DA. The thin film transistor layer TL includes a plurality of thin film transistors (TFTs) each having a respective gate electrode GE, a portion of gate insulating layer 120, a channel portion CH, a respective source electrode SE, a respective drain electrode DE, a portion of protective insulating layer 150, a portion of first organic insulating layer 160, and a respective pixel electrode PE.

The gate electrode GE of each TFT is formed to be extended from a corresponding gate line GL, and the gate insulating layer 120 is formed on the gate line GL and on the gate electrode GE. The channel portion CH includes an active layer 131 including an amorphous silicon (a-Si) and a low-resistance contact layer 132 including amorphous silicon (a-Si) doped with N-type dopants at a high concentration (n+ a-Si).

The source and drain electrodes SE and DE are formed on the channel portion CH, but separated from each other by a TFT channel area. When the TFT is turned ON, the source and drain electrodes, SE and DE. of the TFT are effectively electrically connected with each other through a made-conductive portion of the channel portion CH. The source electrode DE is formed to be extended from the source line DL, and the drain electrode DE is electrically connected to the pixel electrode PE through a contact hole CT. Thus, the thin film transistor TFT having the gate electrode GE, the channel portion CH, the source electrode SE and the drain electrode DE is formed.

The protective insulating layer 150 and the first organic insulating layer 160 are formed one after the next in the recited order on top of the first base substrate 101 and on top of the thin film transistors TFTs formed on the first base substrate 101. The protective insulating layer 150 and the first organic insulating layer 160 have the contact hole CT defined through them so that a portion of the drain electrode DE is exposed for connecting with the pixel-electrode PE. In one embodiment, the first organic insulating layer 160 is composed of a transparent organic insulating material. The upper surface of the first organic insulating layer 160; as well as the upper surface of a soon-described, second organic insulating layer 180 has a composition that can strongly bind with a thermally activated adhesive layer 500 provided between the bottom major surface of the electrophoretic film 200 and the top major surface of the array substrate 100, where the latter top surface of substrate 100 is defined by coplanar upper surfaces of the first and second organic insulating layers, 160 and 180. The thermally activated adhesive layer 500 also binds well to the conductive material of electrodes 191 and 192 in the areas where those black-grayscale inducing electrodes are formed.

The pixel electrode PE is formed on the first organic insulating layer 160, to be electrically connected to the drain electrode DE through the contact hole CT.

The gate insulating layer 120, the protective insulating layer 150, and the first organic insulating layer 160 are sequentially formed on the peripheral area OA (a.k.a. framing area) as well. A light-blocking (and black-grayscale inducing) electrode 191 made for example of an opaque metal material is formed in the array substrate 100 to be disposed directly above the first organic insulating layer 160. During operation, a black grayscale voltage is applied through an appropriate connector to the blocking electrode 191 to cause display thereat of the black grayscale as mentioned above.

The circuit area CA includes a gate circuit layer GCL electrically connected to the plurality of thin film transistors of the display area DA, a second organic insulating layer 180, and a light-blocking layer 192.

The gate circuit layer GCL includes a gate metal layer 110, the gate insulating layer 120, the channel layer 130, a source metal layer 140, the protective insulating layer 150, and a contact electrode 172. In one embodiment, the gate circuit layer GCL and the thin film transistor layer TL are simultaneously formed via the same manufacturing process. The second organic insulating layer 180 may be composed of the same transparent organic insulating material as used for the first organic insulating layer 160.

The blocking layer 192 in the CA area of the array substrate 100 may be composed of the same opaque metal material as used for the blocking electrode 191 in the OA area (a.k.a. framing area). The blocking layer 192 is formed to alignably cover the gate circuit layer GCL, to thus prevent light from being incident to the gate circuit layer GCL from an external source. Thus, leakage current is prevented from flowing due to light striking light-sensitive active elements in the gate circuit part GIC. The second organic insulating layer 180 electrically insulates the contact electrode 172 (which contact electrode 172 can extend to outside the second organic insulating layer 180) and the blocking layer 192. The second organic insulating layer 180 helps to flatten (planarize) the upper surface of the array substrate 100 just as does the coplanar top of the first organic insulating layer 160 formed in the peripheral area OA help to flatten (planarize) the upper surface of the array substrate 100.

The electrophoretic film 200 includes a second base substrate 201, a common electrode 210, and an electrophoretic microcapsules-containing layer 240.

The second base substrate 201 may be made of a flexible material. For example, the second base substrate 201 may include a polyethylene terephthalate (PET) having good light transmissivity, good heat-resistance, good resistance to chemical attack, good mechanical strength, and so on.

The common electrode 210 includes a transparent conductive material. The common electrode 210 is disposed opposite to pixel electrodes PE of the array substrate 100 so as to thereby sandwich the microcapsules in between. A common voltage is applied to the common electrode 210. The common electrode is composed of a transparent conductive material, such as indium tin oxide (ITO), indium zinc oxide (IZO), amorphous indium tin oxide (a-ITO), and so on. The pixel-electrodes PE need not be light-passing ones (since the display operates by reflection of incident light) but they nonetheless can be such and can be also composed of a transparent conductive material, such as indium tin oxide (ITO), indium zinc oxide (IZO), amorphous indium tin oxide (a-ITO), and so on. Alternatively, the pixel-electrodes PE may be composed of an opaque and otherwise appropriate conductor.

The electrophoretic layer 240 includes a plurality of microcapsules 230 and a flexible transparent binder (not referenced with a number) binding the plurality of microcapsules 230 together. Each of the microcapsules 230 includes the electrophoretic molecules or particles charged with one or the other of the positive (+) and negative (−) charges.

Particularly, in one embodiment, the microcapsules 230 include white ink particles 231 charged with the negative (−) charge and the positive (+) charge, black ink particles 232 charged with the opposite charge to the white ink particles 231, and a transparent dielectric 233. Alternatively the white ink particles 231 may be charged with the positive (+) charge and the black ink particles 232 may be charged with the negative (−) charge. As shown in FIG. 2, if the white ink particles 231 are positioned at the upper side, the light incident from the external source is reflected by the white ink particles 231 to thus display a corresponding white colored or white light-reflecting area. (User-observed color may vary if color filters of different colors, e.g., R, G, B are provided above the electrophoretic film 200.)

Figure 3A:
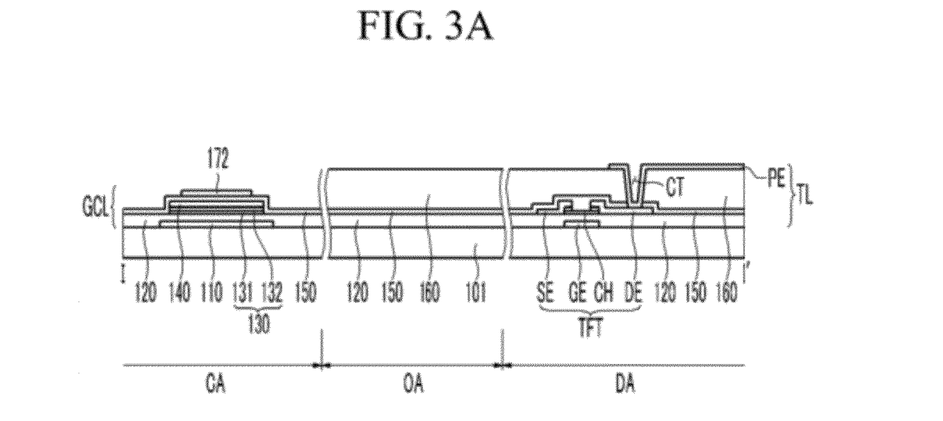
FIGS. 3A and 3B are sectional views illustrating a method for manufacturing the electrophoretic display apparatus in FIG. 2.
Figure 3B:
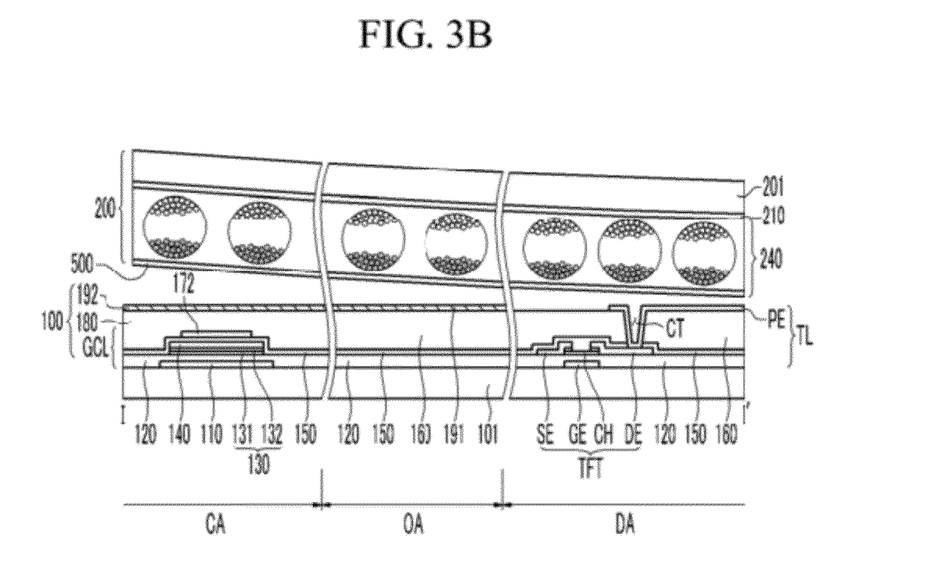

FIGS. 3A and 3B are sectional views illustrating a method for manufacturing the electrophoretic display apparatus of FIG. 2.

Referring to FIGS. 2 and 3A, the thin film transistor layer TL is integrally formed on the first base substrate 101 in the display area DA, and the gate circuit layer GCL is integrally formed in the circuit area CA.

Particularly, a first metal layer is deposited and patterned on the first base substrate 101. Then, the gate electrode GE and the gate line GL are formed in the display area DA, and the gate metal layer 110 is formed in the circuit area CA. The patterned gate metal layer 110 includes the gate electrodes of the plurality of thin film transistors forming the gate circuit part GIC.

The gate insulating layer 120 is formed on the first base substrate 101 on which the gate pattern is formed. The gate insulating layer 120 is formed in the display area DA, the peripheral area OA, and the circuit area CA in common.

The active layer 131 having amorphous silicon (a-Si) and the low-resistance contact layer 132 having amorphous silicon doped with N-type dopants at a high concentration (n+ a-Si) are sequentially deposited and patterned on the gate insulating layer 120. Then, the channel portion CH is formed in the display area DA, and the channel layer 130 is formed in the circuit area CA. The active layer 131 and the low-resistance contact layer 132 are not formed in the peripheral area OA.

A second metal layer is deposited and patterned on the first base substrate 101 on which the channel portion CH and the channel layer 130 have been formed. Then, the source line DL, the source electrode SE, and the drain electrode DE are formed in the display area DA, and the source metal layer 140 is formed in the circuit area CA. The source metal layer 140 includes the source and drain electrodes of the plurality of thin film transistors forming the gate circuit part GIC.

The protective insulating layer 150 is formed on the first base substrate 101 on which the source pattern is formed. The protective insulating layer 150 is formed in the display area DA, the peripheral area OA, and the circuit area CA in common.

Then, the first organic insulating layer 160 having the transparent organic insulating material is formed in the display area DA and the peripheral area OA. However, the first organic insulating layer 160 is not formed in the circuit area CA. The transparency of the first organic insulating layer 160 may be used during manufacture to optically align patterned features below the first organic insulating layer 160 to patterned features of the electrophoretic film 200.

The first organic insulating layer 160 and the protective insulating layer 150 formed in the display area DA are patterned to form the contact hole CT. The protective insulating layer 150 and the gate insulating layer 120 formed in the circuit area CA are patterned to form a plurality of contact holes (not shown).

A conductive and optionally transparent electrode material is deposited and patterned on the first base substrate 101 on which the contact holes are formed, to thus form the pixel electrodes PE in the display area and to thus form a predefined pattern of contact electrodes 172 in the circuit area CA (which area is not yet covered by the second organic insulating layer 180). The contact electrodes 172 may extend beyond an area to be next covered by the second organic insulating layer 180.

Accordingly, the thin film transistor layer TL is formed in the display area DA and the gate circuit layer GCL is formed in the circuit area CA. The gate insulating layer 120, the protective insulating layer 150, and the first organic insulating layer 160 are sequentially formed in the peripheral area OA.

Referring to FIGS. 2 and 3B, the second organic insulating layer 180 having the transparent organic insulating material is formed on the first base substrate 101 in the circuit area CA.

The second organic insulating layer 180 is formed to cover the contact electrodes 172. The first and second organic insulating layers, 160 and 180 are then planarized together so that the second organic insulating layer 180 planarizes its portion of the top surface of the array substrate 100 just as does the first organic insulating layer 160 planarize its respective portion of the top surface of the array substrate 100.

An opaque metal material is next deposited and patterned on the second organic insulating layer 180, to form the light-blocking electrode 191 in the peripheral area OA and to form the light-blocking layer 192 in the circuit area CA. Black grayscale data is applied to the blocking electrode 191 during operation so that the viewing ability of the image displayed in the display area DA is enhanced. The blocking layer 192 is formed to cover the gate circuit layer GCL to block the light from being incident to the gate circuit layer GCL.

The blocking electrode 191 and the blocking layer 192 are formed to complete the array substrate 100. The electrophoretic film 200 having the electrophoretic layer 240 is laminated, and more specifically, flattened against and thereafter adhesively attached to the array substrate 100 by a below described bonding process. The electrophoretic film 200 is attached to cover the display area DA, the peripheral area OA, and the circuit area CA of the array substrate 100.

A selectively activatable adhesive 500 is used when the electrophoretic film 200 is laminated (adhesively attached) to the array substrate 100. In one embodiment, an adhesive film having a thickness of about 25 um is initially covered by protective films on both the front and rear surfaces thereof. First, the front cover is removed and the partly exposed adhesive film is laminated onto (e.g., flattened against so as to remove gas pockets and loosely held by electrostatic and/or alike weak adhesion forces to) the electrophoretic film 200, and secondly, the rear cover is removed and the so-exposed electrophoretic film 200 is laminated onto (e.g., flattened against so as to remove gas pockets and loosely held by electrostatic and/or alike weak adhesion forces to) the array substrate 100. At the time of the second laminating, precise arrangement (alignment) between the electrophoretic film 200 and the array substrate 100 may be required since the adhesive 500, after it is thermally activated, will be strong enough to damage the surface of substrate if it is unintentionally contacted thereto in wrong alignment and afterwards, detachment is attempted. The damage to the electrophoretic film 200 or the array substrate 100 due improperly aligned strong attachment is expensive since it is a half-finished product and must be discarded if the bonding process is carried out with an acceptable flattening and/or alignment.

As taught by the exemplary embodiment of the present disclosure, the trouble may be solved by using a selectively activatable adhesive 500 that is selectively activated for example only at a temperature substantially higher than room temperature. Detaching at room temperature is easy and free from damage to the surface of the substrate since it is not particularly adhesive at room temperature or below. Accordingly, after the temperature-based hardening process is applied, the electrophoretic film 200 and the array substrate 100 are strongly adhered to each other by the cured adhesive layer 500. That is, the electrophoretic film 200 and the array substrate 100 are first flattened out against each other and appropriately aligned with each other at room temperature or a lower temperature, and they are fixed in position relative to one another and thereafter permanently adhered to one another by hardening the adhesive 500 at a high temperature such that they are attached without any substantial misalignment or air or other gas pockets interposed therebetween.

Also, although both surfaces are loosely attached via the not-yet-cured adhesive when trying to align at room temperature, detaching is easy prior to hardening such that damage due to detachment and re-lamination may not be generated even if a misalignment and/or wrinkle-air pocket is generated during a first lamination attempt.

Figure 4A:
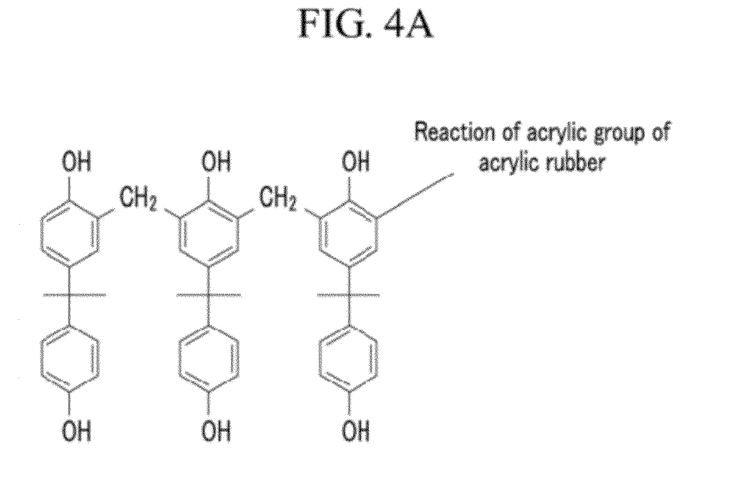
FIG. 4A is a chemical formula of an exemplary adhesive composition of a bisphenol A type.
Figure 4B:
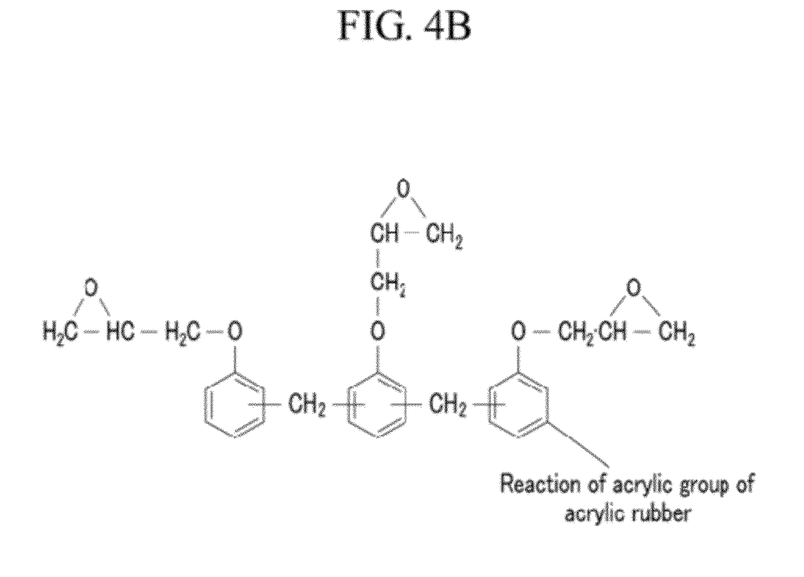
FIG. 4B is a chemical formula of an exemplary adhesive composition epoxy resin.

Exemplary components of the adhesive composition 500 may include one or more phenolyic resins with an OH functional group and an epoxy resin having an aromatic (e.g., benzene-based) component. One example of the phenolyic resins may be bisphenol A, and the corresponding compound may be represented by the chemical formula of FIG. 4A. The structure of the epoxy resin is may be represented by the chemical formula of FIG. 4B. At the above room temperature range of about 50° C.~150° C., the OH functional group of the phenolyic resin (FIG. 4A) is believed to chemically combine (e.g., cross polymerize with) with the epoxy resin to thus form a web-shaped epoxy phenol resin. Additionally, the acrylic groups of the acrylic rubber addend may attach at the sites indicated in FIGS. 4A-4B.

Thus, according to an exemplary embodiment, an adhesive is composed of at least three components of an epoxy phenolyic resin complex of which the phenolyic resin and the epoxy resin are combined (cross polymerized) by thermal reaction at an activating temperature, where the adhesive may additionally include at least one of an acrylic rubber and a silicon filler. Here, when included, the acrylic rubber preferably has a relatively low elasticity and thus contributes to relaxation of stress. Similarly, when included, the silicon filler is believed to contribute to improving cohesion within the adhesive film.

With an increase in proportion of epoxy content, the heat resistance (e.g., resistance to premature polymerization at lower temperatures) of the resulting adhesive material increases but its adhesion strength decreases and the amount of outgas increases. On the other hand, with an increase in proportion of the acryl contents, its heat resistance decreases. Since the silicon filler is agglomerated when the content of the silicon filler is increased, it is desirable to be controlled to be under about 10 wt % with a 1 micron average particle size (e.g., average diameter).

The statistically processed results of testing are shown in Table 1 with respect to properties regarding transmission, detaching, and outgassing. In the experiments, a testing film is inserted between two pieces of glass, light-transmission is measured after it is hardened at 150° C. with a light of a 440 nm wavelength, a T-peeling test is performed to estimate detachment for a rework, the angle between the detaching film and the attached part is kept at 90° and the weight change with the increase of temperature is measured to estimate the amount of outgas.

Formulation X1 in the given Table 1 is composed of 30 wt % of epoxy phenol resin, 60 wt % of acrylic rubber, and 10 wt % of silicon filler, and the average particle size of the epoxy hardener is 500 nm. Formulation X2 is composed of 10 wt % of epoxy phenol resin, 80 wt % of acrylic rubber, and 10 wt % of silicon filler, and the average particle size of the epoxy hardener is 100 nm. The third formulation, X3 is composed of 20 wt % of epoxy phenol resin, 70 wt % of acrylic rubber, and 10 wt % of silicon filler, and the average particle size of the epoxy hardener is about 10 nm.

TABLE 1

| | Items | | HS-300-10-X1 | HS-300-10-X2 | HS-300-10-X3 |
|---|---|---|---|---|---|
| Transparency | Transmittance at 400 nm (%) | | 22 | 45 (Foaming) | 82 |
| Workability | Tackiness at 40° C.(N) | | 0.11 | 2.3 | 0.35 |
| | Hand peeled | | GOOD | BAD | PASS |
| | T-peel strength (N/m) | PE cover film | 0.6 | 27 | 0.7 |
| | | PET base film | 1.7 | 2.2 | 0.3 |
| Outgas | Temperature of mass change ratio (° C.) | −1% | 292 | 141 | 243 |
| | | −3% | 328 | 234 | 316 |
| | | −5% | 339 | 276 | 336 |

In regards to properties of the outgas, a 1% weight loss in X1 and X3 was observed at a higher temperatures as compared to the −1% loss temperature of X2. In the same way, 3% and 5% weight losses of X1 and X3 were observed at higher temperatures as compared to the corresponding −3% and −5% loss temperatures of X2. In other words, thermal stability of X1 and X3 is better than that of X2 with regard to mass loss (e.g., due to outgassing).

In regards to detachment of a film at room temperature, X1 and X3 are relatively better than X2. From the test, required force to detach is minimal, at 0.3N/m in the combination of X3 and the PET base film.

The best performance in the light-transmission test was observed with X3.

Figure 5:
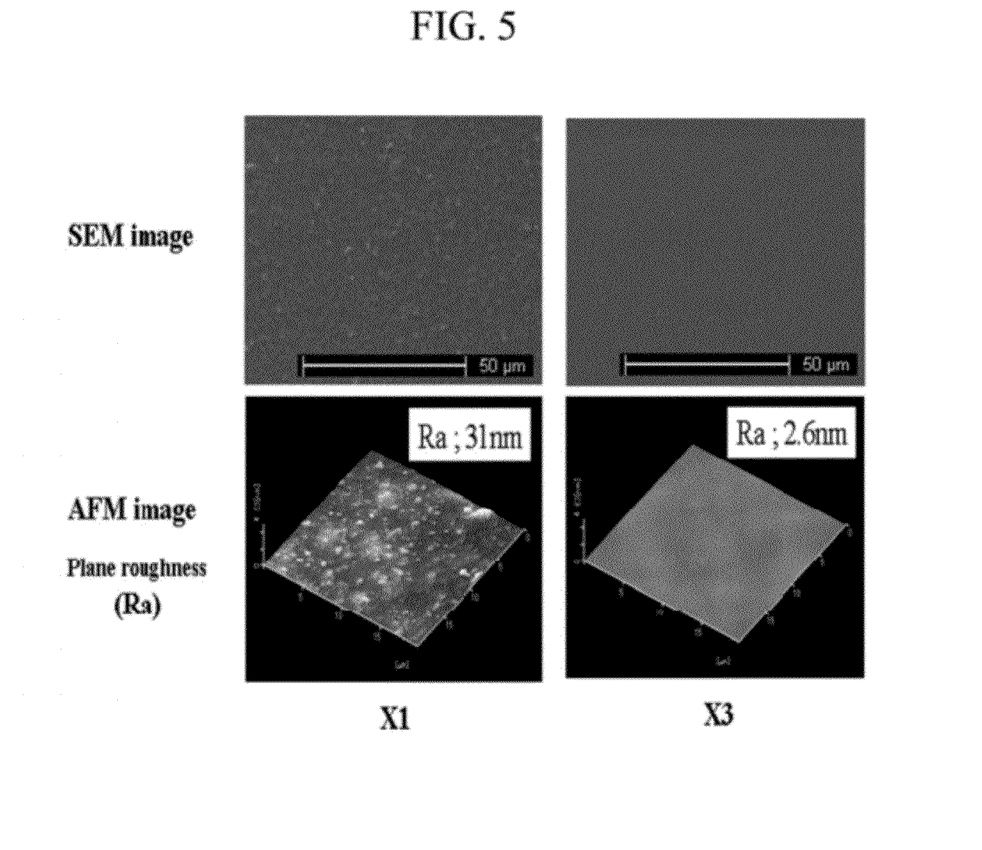
FIG. 5 shows SEM and AFM pictures according to exemplary X1 and X2 samples.

In FIG. 5, surface SEM (scanning electron microscope) and AFM (atomic force microscope) images in regards to X1 samples (left column) and X3 samples (right column) are presented. Phase decomposition of acryl rubber and epoxy resin is well established in the X1 sample as seen in its AFM image.

Figure 6:
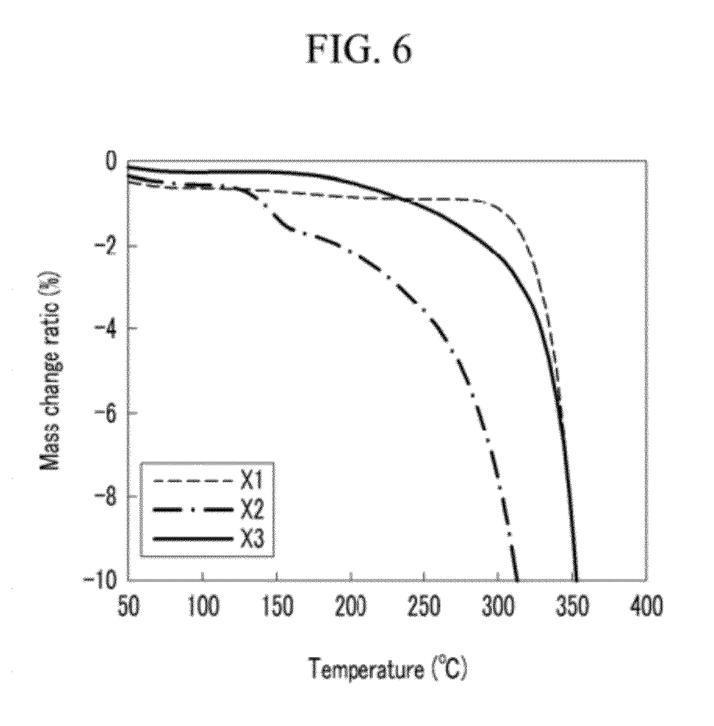
FIG. 6 is a diagram of weight variation according to an increase of temperature for exemplary X1, X2, and X3 samples.

In FIG. 6, weight change versus progressive increase of temperature in regards to X1, X2, and X3 samples is graphed. The superior thermal stability of the X1 composition (dashes only plot line) is shown as best in the diagram relative to X2 (dash-dot plot line) and X3 (solid) by virtue of the substantially more flat and low loss percent all the way out to about 300° C. whereas X2 and X3 exhibit faster mass loss at lower temperatures (although X3 is superior below about 250° C.).

Accordingly, if prevention of compositional change in the utilized adhesive is desired up to as high as about 300° C. (see FIG. 6, X1 plot) and the higher surface roughness (see FIG. 5, left column side) of cured X1 is acceptable, then the X1 composition and its approximating equivalents may be preferred. On the other hand, if a reduced surface roughness (see FIG. 5, right column side) in the utilized adhesive is desired and a lesser selectivity in terms of activating temperature is acceptable, then the X3 composition and its approximating equivalents may be preferred.

The claims in this application are different from those of the application(s) from which priority is claimed. Applicant rescinds any disclaimer of claim scope made in the related application(s) and requests that any previous disclaimer and previously cited references be revisited. Further, any disclaimer made in the instant application is not intended to be read into the predecessor application(s).

What is claimed is:

1. An electrophoretic display comprising:
    an array panel including a thin film transistor connected to a gate wire and a source wire, and a pixel electrode connected to the thin film transistor;
    an electrophoretic film including an electrophoretic layer and a common electrode; and
    an adhesive positioned between the electrophoretic film and the array panel,
    wherein the adhesive comprises:
        an epoxy phenol resin made of the epoxy resin and the phenol resin at an inclusion by weight value of greater than 0% and under about 50% by weight composition ratio,
        a silicon filler at an inclusion by weight value of greater than 0% and under about 15% by weight composition ratio, and
        an acrylic rubber at an inclusion by weight value of greater than about 40% and under about 80% by weight composition ratio.

2. The electrophoretic display of claim 1, wherein the adhesive is included in an adhesive layer positioned between a surface of the electrophoretic film and a surface the array panel.

3. The electrophoretic display of claim 1, wherein the phenol resin includes bisphenol A.

4. The electrophoretic display of claim 1, wherein the adhesive does not exhibit substantial adhesion to at least one of the electrophoretic film and the array panel unless the adhesive is subjected to a curing temperature substantially greater than a room temperature.

5. The electrophoretic display of claim 4, wherein the room temperature is greater than or equal to 50° C.

* * * * *